United States Patent [19]

Swanson et al.

[11] Patent Number: 5,938,270

[45] Date of Patent: Aug. 17, 1999

[54] QUICK RELEASE BOW-TO-CABLE CONNECTOR FOR A COVERING SYSTEM

[75] Inventors: Bradford Paul Swanson; Robert Ray Brewer, both of Utica, S. Dak.

[73] Assignee: Shur Company, Yankton, S. Dak.

[21] Appl. No.: 08/920,093

[22] Filed: Aug. 26, 1997

[51] Int. Cl.$^6$ ....................................................... B60P 7/02
[52] U.S. Cl. ................................ 296/100.11; 296/100.13; 296/105
[58] Field of Search .......................... 296/100.11, 100.12, 296/100.13, 104, 105; 160/84.02, 84.01, 84.06

[56] References Cited

U.S. PATENT DOCUMENTS

| | | | |
|---|---|---|---|
| 4,995,663 | 2/1991 | Weaver et al. | 296/100.11 |
| 5,080,423 | 1/1992 | Merlot et al. | 296/105 |
| 5,102,182 | 4/1992 | Haddad, Jr. | 296/100.13 |

*Primary Examiner*—D. Glenn Dayoan
*Assistant Examiner*—Jason Morrow
*Attorney, Agent, or Firm*—Jones, Day, Reavis & Pogue

[57] ABSTRACT

A connector is provided between a bow end and a cable system that moves the bow across the opening of a container or truck box. One end of the connector is adapted to mate with the end of the bow. The other end of the connector has a bore through which the cable passes. A first open slot in the connector communicates with the bore and is oriented transversely of the bore. A second open slot extending through a first side of the connector communicates with both the bore and the first open slot and opens in a first direction relative to the connector. A third open slot extending through a side of the connector opposite the first side communicates with both the bore and the first open slot and opens in a second direction relative to the first direction. The connector may be conveniently attached to the cable by passing the cable through the first slot into transverse alignment with the bore to the point where it is parallel to the transverse slots. Subsequent lateral rotation of the connector allows the cable to simultaneously pass through the second and third slots and to become longitudinally aligned within the bore. Because the subsequent mating of the bow end with the opposite end of the connector restricts lateral rotation in the opposite direction, movement of the connector in a direction other than along the cable is prevented. This construction permits the connector and associated bow to be readily removed and re-attached to the cable without disassembly of the cable system.

15 Claims, 3 Drawing Sheets

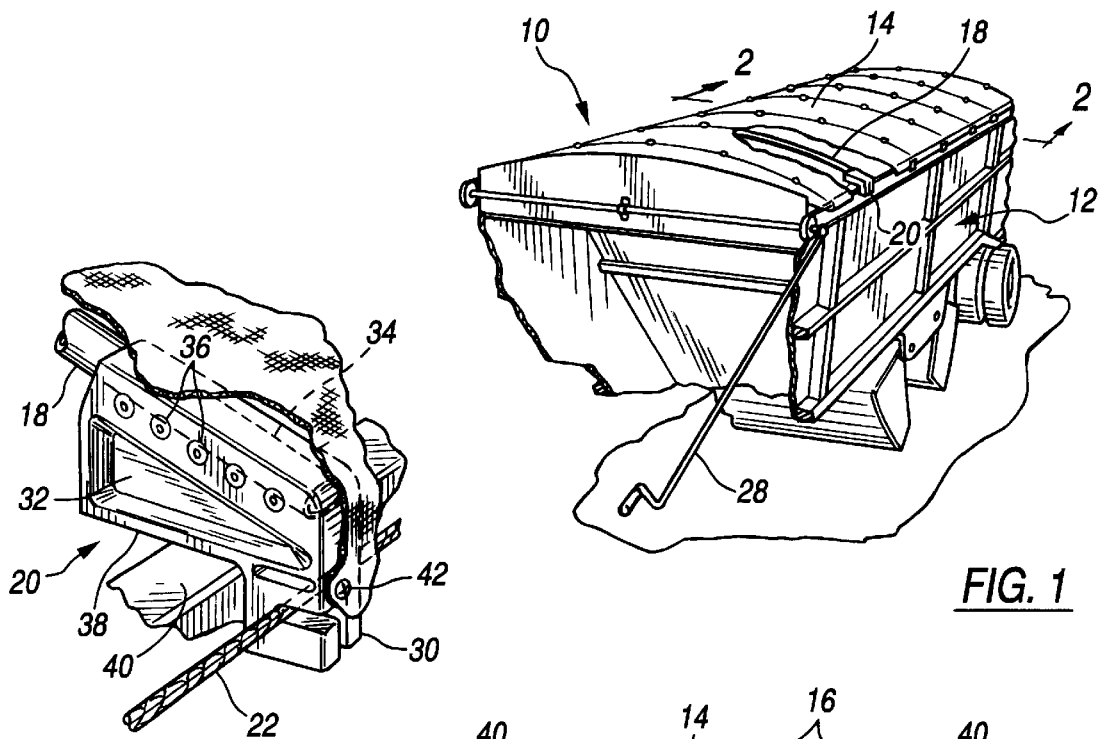
FIG. 1
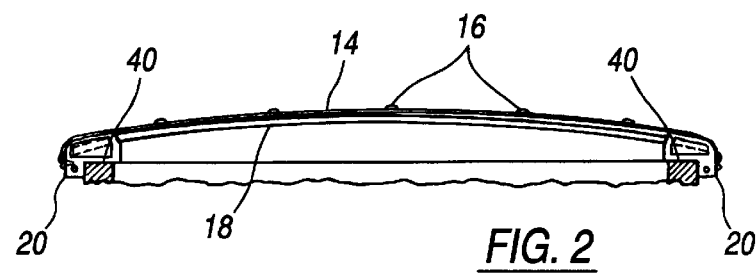
FIG. 4
FIG. 2
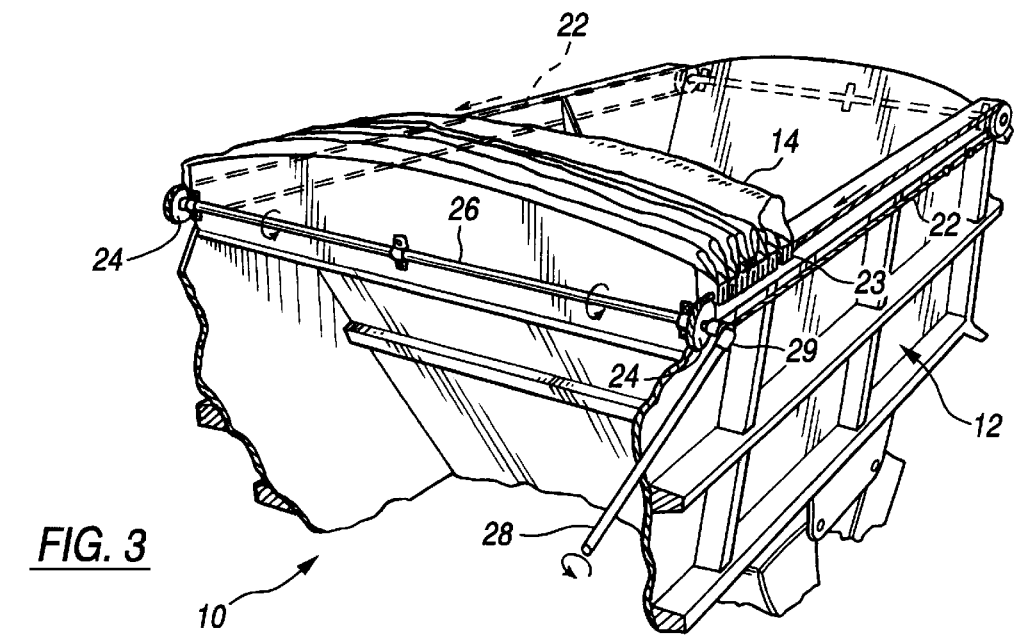
FIG. 3

1

QUICK RELEASE BOW-TO-CABLE CONNECTOR FOR A COVERING SYSTEM

BACKGROUND OF THE INVENTION

1. Field of the Invention

The present invention relates generally to systems for covering open top vehicles or containers and more particularly to the interconnection between bows that support such coverings and cables that move the bows.

2. Description of the Prior Art

It is desirable to use tarpaulins or other coverings on grain hauling trucks and dump trucks. The tarpaulins serve not only to shelter the container contents against the elements, but also to maintain the contents in the container during high speed transportation.

A number of systems exist for covering truck and trailer containers with tarpaulins such that the tarpaulins may be extended from an open position, exposing the interior of the container, to a closed position covering the container. Typically, these systems involve the use of metal bows that span the width of the opening to support the tarpaulin at parallel spaced intervals. For some applications, it is desirable to provide a system wherein the bows are at least partially displaceable from over the opening to provide greater access to the container interior. One such system is disclosed in U.S. Pat. No. 5,487,584, issued to Jespersen. In that system, the tarpaulin rolls up lengthwise along a side of the container and the bows, joined by a ridgepole, pivot at least partially out the way of the container opening.

Another design, which we will refer to as the "accordion-style tarp system," employs a plurality of parallel spaced bows to which the tarpaulin is fastened. The ends of the bows are attached to a cable arrangement running lengthwise on both sides of the container. Operation of the cables acts to slide the bow ends along upper side rails of the container such that the tarpaulin may be moved in accordion fashion between the open and closed positions. The cable in this system can be supported on pulleys which, when actuated by a crank, draw a lead bow across the container opening with the other bows passively drawn by the tarpaulin attached between the bows. The operation is much the same as that of a typical curtain rod.

The cable of the accordion-style tarp system is threaded through the bow ends. Should a bow become damaged and require replacement, the entire cable must be unthreaded from the bow ends and adjacent bows and rethreaded through a new bow. This disassembly necessarily involves significant manual labor and consequent downtime of the vehicle equipment.

Accordingly, it is an object of the present invention to provide a connector between the bow end and the cable that allows removal and replacement of the bow without unthreading and rethreading of the cable. Further, it is an object of the invention to provide such a connector that is capable of being adjusted to various widths of trailers, can be manufactured as a single piece, and is readily molded in a cost effective manner.

SUMMARY OF THE INVENTION

The present invention provides an improved connector between a bow end and a cable system that moves the bow across the opening of a container or truck box. One end of the connector is adapted to mate with the end of the bow. The other end of the connector has a bore through which the cable passes. A first open slot in the connector communicates with the bore and is oriented transversely of the bore. A second open slot extending through a first side of the connector communicates with both the bore and the first open slot and opens in a first direction relative to the connector. A third open slot extending through a side of the connector opposite the first side communicates with both the bore and the first open slot and opens in a second direction relative to the first direction.

The connector may be conveniently attached to the cable by passing the cable through the first slot into transverse alignment with the bore to the point where it is parallel to the transverse slots. Subsequent lateral rotation of the connector allows the cable to simultaneously pass through the second and third slots and to become longitudinally aligned within the bore. Because the subsequent mating of the bow end with the opposite end of the connector restricts lateral rotation in the opposite direction, movement of the connector in a direction other than along the cable is prevented. This construction permits the connector and associated bow to be readily removed and reattached to the cable without disassembly of the cable system.

BRIEF DESCRIPTION OF THE DRAWINGS

The foregoing and other novel features and advantages of the invention will be better understood in light of the following detailed description and accompanying drawings, wherein:

FIG. 1 is a front side perspective view of a truck trailer having a container covered by a tarpaulin in accordance with the invention;

FIG. 2 is a partial cross-sectional view of the covered container taken substantially along the line 2—2 of FIG. 1;

FIG. 3 is a front side perspective view of a truck trailer showing the tarpaulin retracted from over the container;

FIG. 4 is a detail view of a bow-to-cable connector as installed in accordance with the invention;

DETAILED DESCRIPTION OF THE PREFERRED EMBODIMENTS

Figure 5:
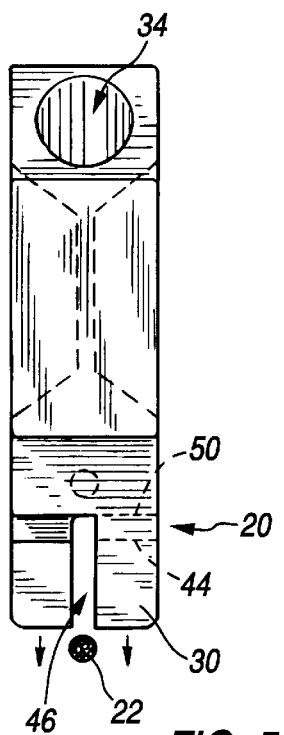
FIG. 5 is an end view of the bow-to-cable connector illustrating an initial alignment in preparation of installation on a support cable.
Figure 6:
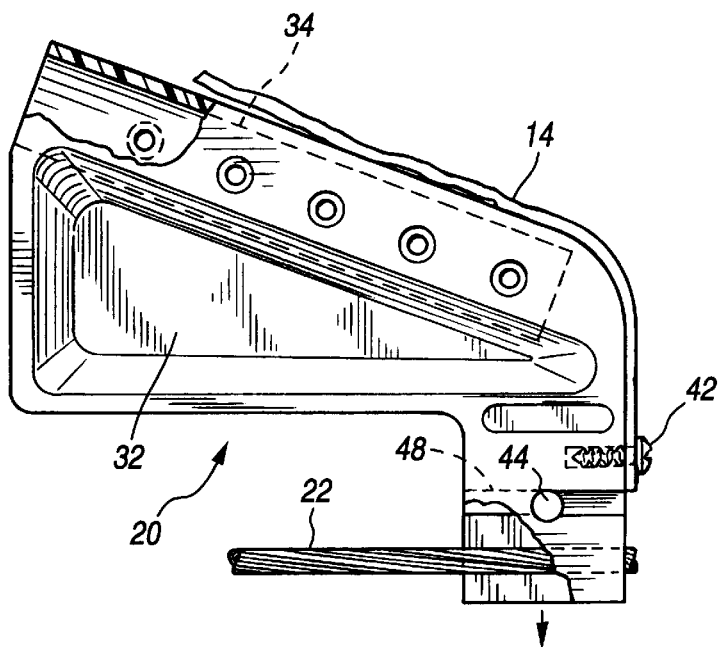
FIG. 6 is a side view of the bow-to-cable connector illustrating the beginning of a first second stage in its installation on a support cable.
Figure 7:
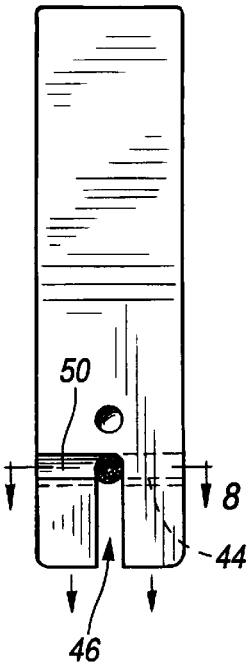
FIG. 7 is a view of the bow-to-cable connector end opposite the view of FIG. 5 illustrating the conclusion of the first stage in the installation of the connector on a support cable.
Figure 8:
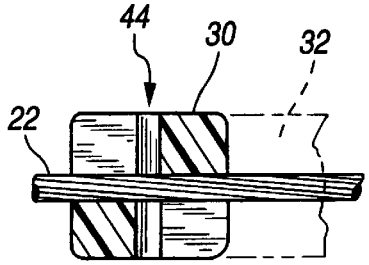
FIG. 8 is a cross-sectional view taken along the line 8—8 of FIG. 7.

Referring now to the drawings and initially to FIG. 1, a truck trailer is designated generally by the reference numeral 10 and includes as a principal component an open top container or box 12. The illustrated truck trailer 10 is of a type particularly suitable for hauling asphalt, aggregate, or the like. However, the present invention is not limited to such a truck trailer and may also be used advantageously on grain trailers, dump truck boxes or refuse hauling containers, for example, or stationary open top containers. The container 12 is shown in FIG. 1 as being covered by a tarpaulin 14 extended over its open top. The tarpaulin may be fabricated from a variety of suitable materials such as an open weave mesh or vinyl. FIG. 2 shows the tarpaulin 14 attached by suitable fasteners 16 to bows 18 extending across the width of the container 12. The bows 18 are, in turn, attached at their opposite ends to bow-to-cable connectors 20 which will be described in detail hereinafter.

Figure 9:
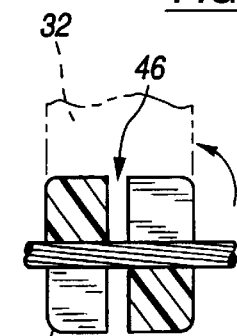
FIG. 9 is a cross-sectional view similar to FIG. 8 illustrating the connector after the second, lateral rotation stage of installation on the cable.

Turning now to FIG. 3, the tarpaulin 14 is shown in the open position over the top of container 12 exposing the interior of the container. The system for retracting the tarpaulin includes continuous cables 22 supported on pulleys 24 on opposite upper sides of the container 12. A shaft 26 connects the pair of forward pulleys 24; one pulley 24 is provided with a crank lever 28 and associated universal joint 29. The connectors 20, as best seen in FIG. 4, are threaded on the cables 22 as to slide freely thereon, except for the two connectors 23 (only one shown in FIGS. 9, 10 and 11) associated with the rearward bow which are fixed to the cables 22 as described below (see FIG. 10). By this arrangement, an operator can manually turn the crank lever 28 causing the cables 22 to rotate about the pulleys. This action pulls the connectors 23 associated with the rearwardmost connectors toward the front of the container 12 compressing the tarpaulin 14 and associated free bows 18 in accordion fashion into a retracted or open position at the front of the container 12.

Details of the connector 20 can be seen in FIG. 4. The connector 20 is generally L-shaped having a downwardly projecting leg portion 30 and a laterally projecting portion 32. The laterally projecting portion 32 is provided with a cylindrical, blind bore 34 adapted in depth and cross-section to receive and mate with a bow end 18. The bow 18 is rigidly attached to the connector 20 by one or more screws or bolts 36. The bore 34 has sufficient depth to allow for receipt of and attachment to bows 18 and to be adjustable for varying widths of trailers. The laterally projecting portion 32 is provided with a generally planar lower, relatively low friction surface 38 to freely slide on an upper rail 40 of the container 12. Molding the inventive connector of a hard plastic will accomplish a suitable friction surface. The bow end 18 is supported by the connector 20 such that the bow 18 is in a generally upright position when viewed from the side. The tarpaulin 14 may be secured to the connector 20 by a suitable screw 42.

In accordance with the invention, and as best seen in FIGS. 5–9, the connector 20 is designed to be attachable to the cable 22 without any removal of the cable 22 system from the container 12. To this end, the connector 20 is provided with a through bore 44 through which the cable 22 freely passes when the connector 20 is installed on the cable 22. However, an open slot 46 is formed in the projecting portion 30 running longitudinally of the connector 20 and in communication with the through bore 44. Also, extending laterally through a first side of the projecting portion 30 into communication with both the slot 46 and the bore 44 is a second open slot 48. Further, extending laterally through a second side of the projecting portion 30 into communication with both the slot 46 and bore 44 is a third open slot 50. By this arrangement of the slots 46, 48 and 50, together with the through bore 44, the connector 20 may be readily installed on the cable 22 by guiding the cable 22 first into the longitudinal slot 46 (see FIGS. 5–8) until the cable 22 is in transverse alignment with the bore 44. Then the connector 20 may be rotated through ninety degrees whereupon the cable passes through both slots 48 and 50 simultaneously and becomes trapped within the bore 44 ready for use. Only reverse lateral rotation will allow any movement other than slidable movement along the cable. Such reverse rotation will be prevented when the bow end 18 is mated with bore 34.

Figure 10:
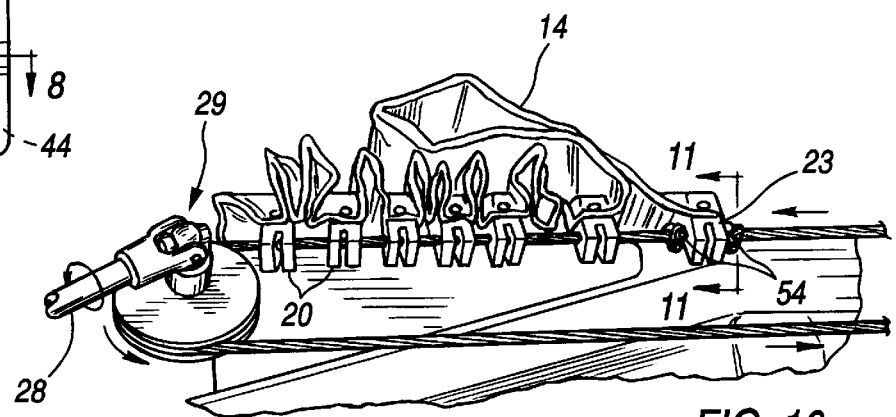
FIG. 10 is a partial side perspective view showing the cover as retracted from over the trailer container.
Figure 11:
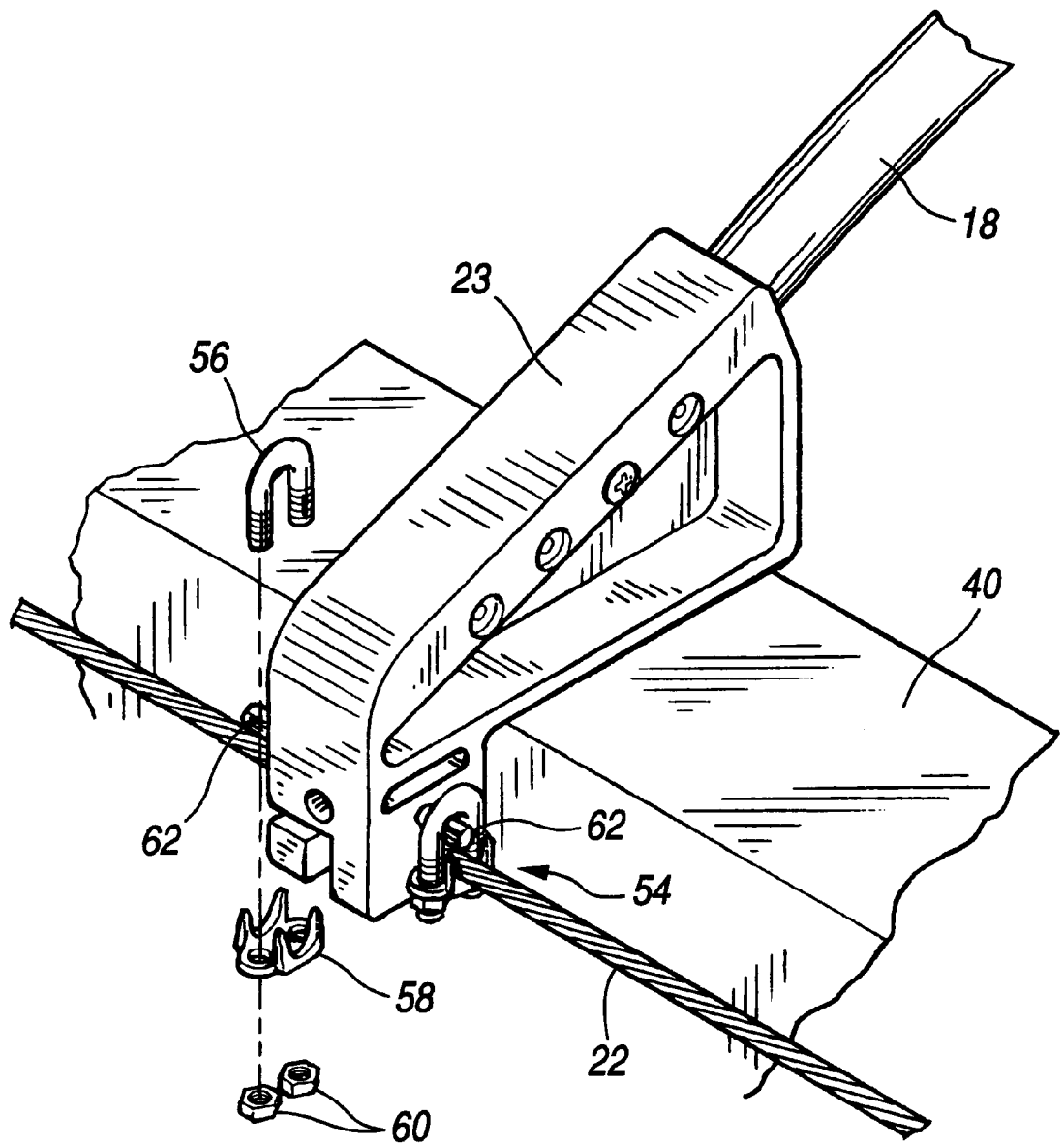
FIG. 11 is a partial perspective view illustrating the attachment method for the rearward most connectors.

FIG. 10 shows further details of the system illustrating a plurality of connectors 20 moved to a stored position. A rearward most connector 23 is shown in FIG. 11 as locked longitudinally of the cable 22 by a pair of opposed cable clamps 54. The clamps 54 are of a common type including U-bolts 56 and cooperating plates 58 which are tightened onto the cable 22 by suitable nuts 60. In a preferred form, the rearward most connectors 23 are provided with transverse stabilizing pins 62 extending parallel to the cables 22, and the cable clamps 54 are dimensioned to clamp over both the pins 62 and the cables 22 simultaneously.

It is contemplated that a tarp system using the inventive bow-to-cable connector also may use wind guards. Wind guards can be attached to the bow connectors (through the tarpaulin) to mate with an appropriately located anchor(s) on the side of the box when the system is in the closed position. Such wind guards are conventional, have been known in the art for fifteen years or more, and can be adapted to work with a system using the inventive bow connectors by those ordinarily skilled in the art.

It can now be appreciated that a bow-to-cable connector 20 in accordance with the invention offers considerable advantages over the prior art. Should a bow 18 or connector 20 become damaged in use, the bow end 18 is simply slid out of the bore 34 of the connector 20. This leaves the connector 20 free to be rotated relative to the cable 22 whereupon the cable 22 simply passes out of the slot 46 and the connector 20 is completely released. Reinstallation of the connector 20 is readily accomplished in reverse manner. Thus, the manual labor involved in disassembling the cable 22 system and unthreading and rethreading connectors is completed avoided. While other means could be used to provide a detachable connector, such as brackets and screws, for example, the present connector 20 may be readily molded as a single part from suitable plastic and requires no auxiliary hardware or moving parts to detach it and re-attach it about the cable. Plastic is desirable also as it can provide a low friction surface for the connector's contact with the side rail. Accordingly, the connector 20 is highly cost effective and convenient to manufacture while also being sturdy in construction to have relatively long life.

While the present invention has been described in connection with a preferred embodiment thereof, it will be apparent to those skilled in the art that many changes and modifications may be made without departing from the true spirit and scope of the present invention. Accordingly, it is intended by the appended claims to cover all such changes and modifications as come within the spirit and scope of the invention.

What is claimed is:

1. A bow-to-cable connector for an accordion-style system covering the top opening of a container or vehicle, the system including a covering supported by bows that are moved between an open and closed position by cables, each bow having two ends, the bow spanning between the sides of the opening, the connector comprising:

a first portion adapted to engage a bow end, the first portion having a side adapted for slidable movement along the sides of the opening while maintaining said bow in spanning relationship across the width of said container; and a second portion containing a bore therethrough for slidable engagement with the cable, the bore communicating with slots, said slots being dimensional and configured to allow removal of said connector from cable when the first portion is disengaged from the bow end and upon manual rotation of said connector relative to said cable.

2. The connector of claim 1 wherein the side of the first portion is a planar bearing surface.

3. The connector of claim 2 wherein the second portion projects and extends downwardly from said planar bearing surface when said connector is supported on the side of the opening.

4. The connector of claim 1 wherein the slots comprise a first open slot in communication with said through bore and oriented transversely of said through bore, a second open slot in communication with both said through bore and said first open slot extending through a first side of said connector and open in a first direction relative to said connector, and a third open slot in communication with both said through bore and said first open slot extending through a side of said connector opposite said first side and open in a second direction relative to said first direction.

5. The connector of claim 4 wherein said connector is installed on said cable such that said cable is longitudinally aligned within said through bore.

6. The connector of claim 1 wherein the first portion and second portion are approximately perpendicular to one another.

7. A system for covering an open top of a container comprising:

a plurality of parallel spaced bows each having opposed free ends;

a connector attached to each free end of each bow, said connector having a bearing surface for slidably supporting each bow on opposed upper rails of the container;

a flexible cover attached to said bows at spaced intervals along said cover;

a pair of pulleys journaled for rotation on opposite sides of the container, said pairs of pulleys each supporting endless cable for translational movement parallel and in closely spaced relation to said rails;

a through bore through each connector for receiving one of said cables and configured to permit said connectors and associated bows to move translationally along said cables and said rails;

means for rotating said pulleys;

means for fixedly securing the connectors of one bow to said cables; and slot means communicating with the through bore of each connector and being dimensioned and configured to permit manual removal of said connector from said cable upon rotational movement of said connectors relative to said cable.

8. The system of claim 7 wherein said slot means comprises a first open slot in communication with said through bore and oriented transversely of said through bore, a second open slot in communication with both said through bore and said first open slot extending through a first side of said connector and open in a first direction relative to said connector, and a third open slot in communication with both said through bore and said first open slot extending through a side of said connector opposite said first side and open in a second direction relative to said first direction.

9. The system of claim 8 wherein said connector is installed on said cable such that said cable is longitudinally aligned within said through bore.

10. A trailer for hauling aggregates, asphalt, gravel, foodstuffs or other material having a body assembly with an open top and a cover system for selectively covering said open top, the cover system comprising:

a plurality of parallel spaced bows each having opposed free ends;

a connector attached to each free end of each bow, said connector having a bearing surface for slidably supporting each bow on opposed upper rails of the container;

a flexible cover attached to said bows at spaced intervals along said cover;

a pair of pulleys journaled for rotation on opposite sides of the container, said pairs of pulleys each supporting and endless cable for translational movement parallel and in closely spaced relation to said rails;

a through bore through each connector for receiving one of said cables and configured to permit said connectors and associated bows to move translationally along said cables and said rails;

means for rotating said pulleys;

means for fixedly securing the connectors of one bow to said cables; and slot means communicating with the through bore of each connector and being dimensioned and configured to permit manual removal of said connector from said cable upon rotational movement of said connectors relative to said cable.

11. The trailer of claim 10 wherein said slot means comprises a first open slot in communication with said through bore and oriented transversely of said through bore, a second open slot in communication with both said through bore and said first open slot extending through a first side of said connector and open in a first direction relative to said connector, and a third open slot in communication with both said through bore and said first open slot extending through a side of said connector opposite said first side and open in a second direction relative to said first direction.

12. The trailer of claim 11 wherein said connector is installed on said cable such that said cable is longitudinally aligned within said through bore.

13. A method of attaching a bow to a cable, the bow being of type for supporting a retractable tarpaulin cover over a box container, the method comprising the steps of:

providing a connector for attachment of a bow to a cable, said connector having means for connection to said bow and being provided with a through bore through which a cable passes;

providing slot means in said connector in communication with said bore, said slot means being configured to receive said cable and allow said cable to pass into said bore only upon rotation of said connector relative to said cable;

inserting said cable into said slot means; and rotating said connector relative to said cable whereupon said cable passes into said bore.

14. The method of claim 13 wherein said slot means comprises a first open slot in communication with said through bore and oriented transversely of said through bore, a second open slot in communication with both said through bore and said first open slot extending through a first side of said connector and open in a first direction relative to said connector, and a third open slot in communication with both said through bore and said first open slot extending through a side of said connector opposite said first side and open in a second direction relative to said first direction.

15. The method of claim 14 wherein said connector is attached to said cable by passing said cable through said first slot into transverse alignment with said through bore, then rotating said connector such that said cable simultaneously passes through said second and third slots and becomes longitudinally aligned within said through bore.

* * * * *